Jan. 2, 1968     C. O. DICKENSHEETS ET AL     3,361,371
ARMATURE WINDING MACHINE

Filed Jan. 28, 1965     3 Sheets-Sheet 1

INVENTOR.
CARLTON O. DICKENSHEETS
ROBERT N. SLAYTON
BY

*Dybvig & Dybvig*
THEIR ATTORNEYS

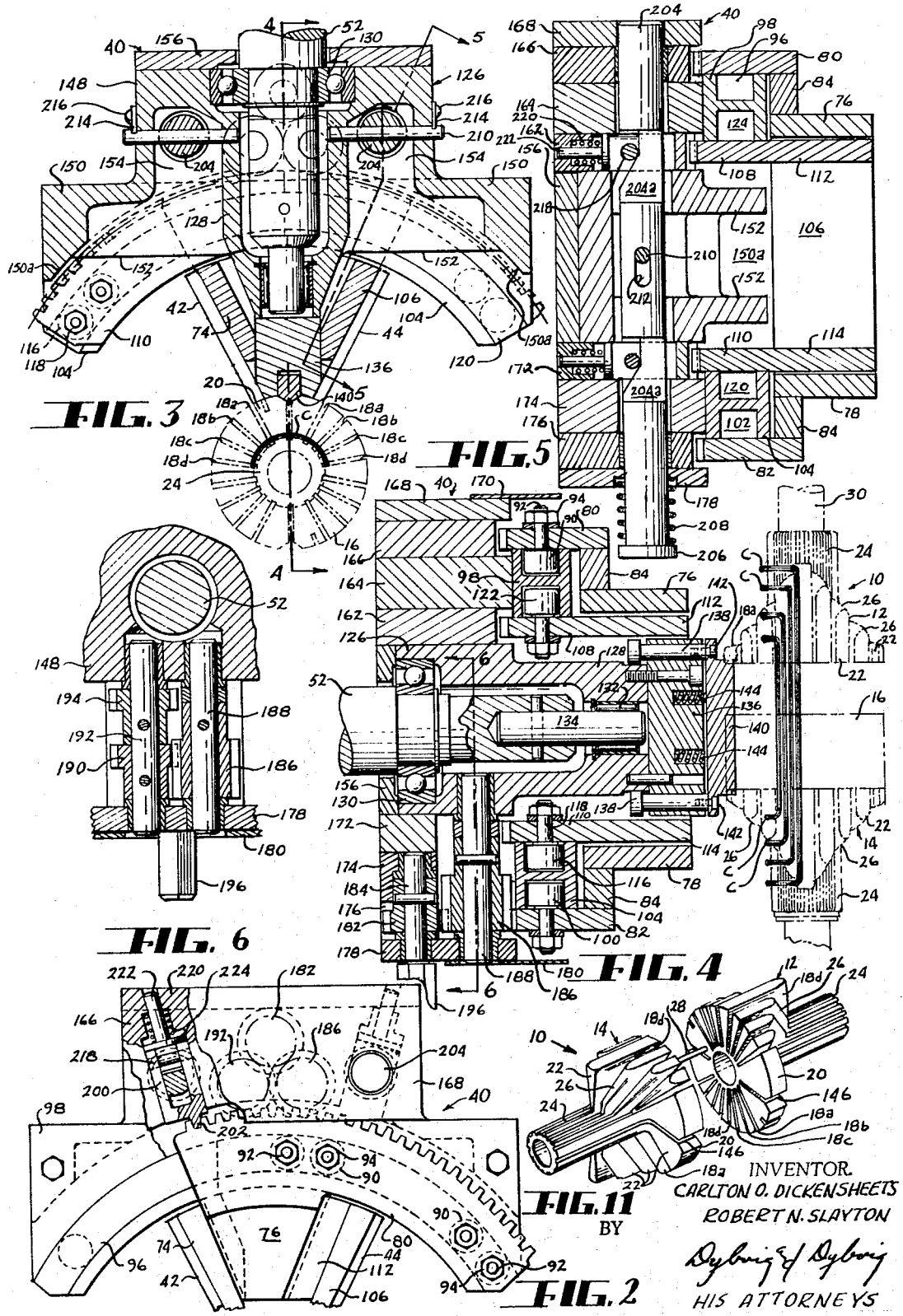

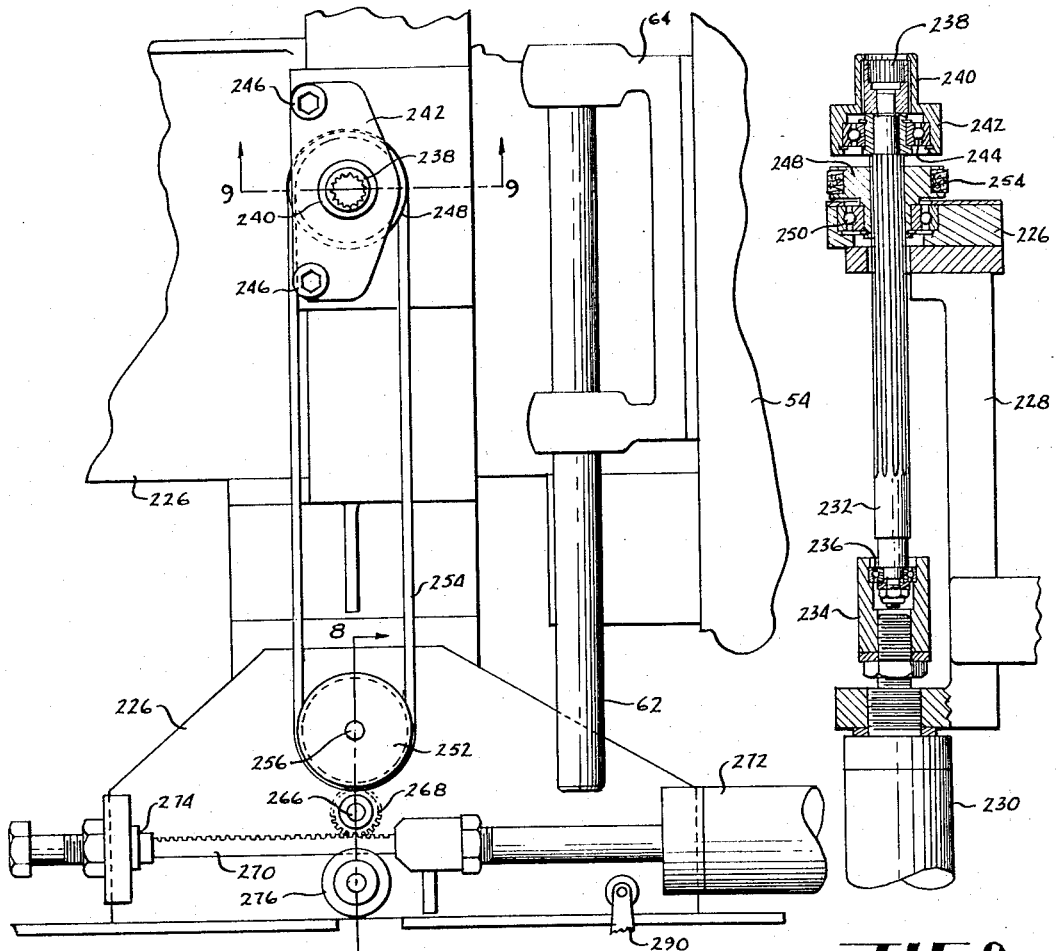
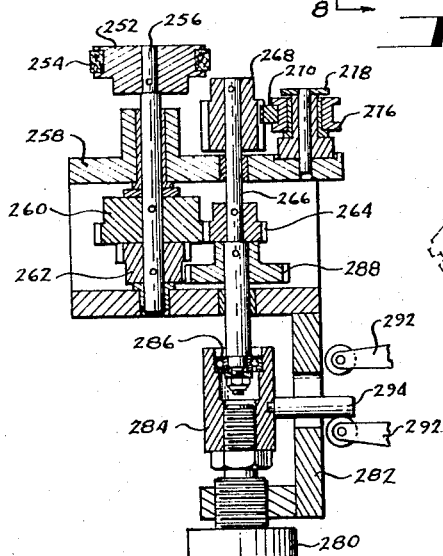
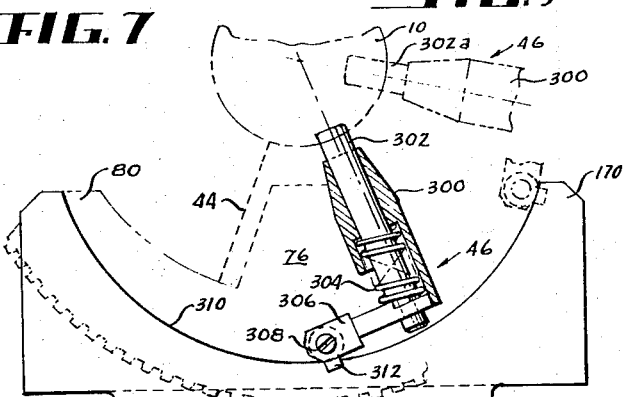

United States Patent Office 3,361,371
Patented Jan. 2, 1968

3,361,371
ARMATURE WINDING MACHINE
Carlton O. Dickensheets, Piqua, and Robert N. Slayton, Enon, Ohio, assignors, by mesne assignments, to The Globe Tool and Engineering Company, Dayton, Ohio, a corporation of Ohio
Filed Jan. 28, 1965, Ser. No. 428,678
6 Claims. (Cl. 242—13)

This invention relates to a coil winding machine and more particularly to an automatically adjustable coil winding form used in winding coils of several different sizes.

In winding coils for field members of motors of the like, one type of coil winding machine utilizes a dummy rotor or mandrel having slots in which coils of wire are wound. After being loaded with coils, the mandrel is positioned within the bore of a field member and the coils transferred from the mandrel to the field member slots. The coils may initially be wound by a rotating wire laying device, known as a flier or spinner, about a coil winding form placed against the mandrel between the pair of mandrel slots which are to receive the coil. Normally the sides of the coil winding form slope toward one another so that the wire coiled thereabout slides into the mandrel slots.

The typical coil winding form has a predetermined size and is usable only in winding coils of a predetermined width. For some applications, however, it is desirable to use a coil winding form having a variable width. For example, in winding coils for distributed pole motors, it is convenient to wind all of the coils for one pole in a single mandrel. The mandrel is designed to receive a plurality of substantially concentric coils. The concentric windings for such a mandrel may best be wound in sequence using a coil winding form having an adjustable width to accommodate the spacing between several different pairs of slots.

Accordingly, an object of this invention is to provide an adjustable coil winding form.

Another object of this invention is to provide an adjustable coil winding form which is automatically adjusted to form different coil sizes.

Other objects and advantages will become apparent from the following description.

Referring to the drawings,

FIGURE 2 is a plan view, with portions broken away and in cross-section, of a portion of a coil form head and constituting part of the apparatus shown in FIGURE 1.

FIGURE 3 is a cross-sectional view of the coil form head taken along line 3—3 of FIGURE 1.

FIGURE 4 is a cross-sectional view of the coil form head, as viewed in the direction of arrows 4—4 of FIGURE 3.

FIGURE 5 is a cross-sectional view of a portion of the winding form head taken along the line 5—5 of FIGURE 3.

FIGURE 6 is a cross-sectional view of a portion of the coil form head as viewed in the direction of arrows 6—6 of FIGURE 4.

FIGURE 7 is a plan view, with portions broken away, of an actuating mechanism forming a portion of the assembly shown in FIGURE 1.

FIGURE 8 is a cross-sectional view of a portion of the actuating mechanism taken along line 8—8 of FIGURE 7.

FIGURE 9 is a cross-sectional view of another portion of the actuating mechanism taken along line 9—9 of FIGURE 7.

FIGURE 10 is a plan view, with portions broken away and in cross-section, of the coil form head shown in FIGURE 1 and illustrating a cam and cam follower used in association with a wire guide finger.

Figure 1:
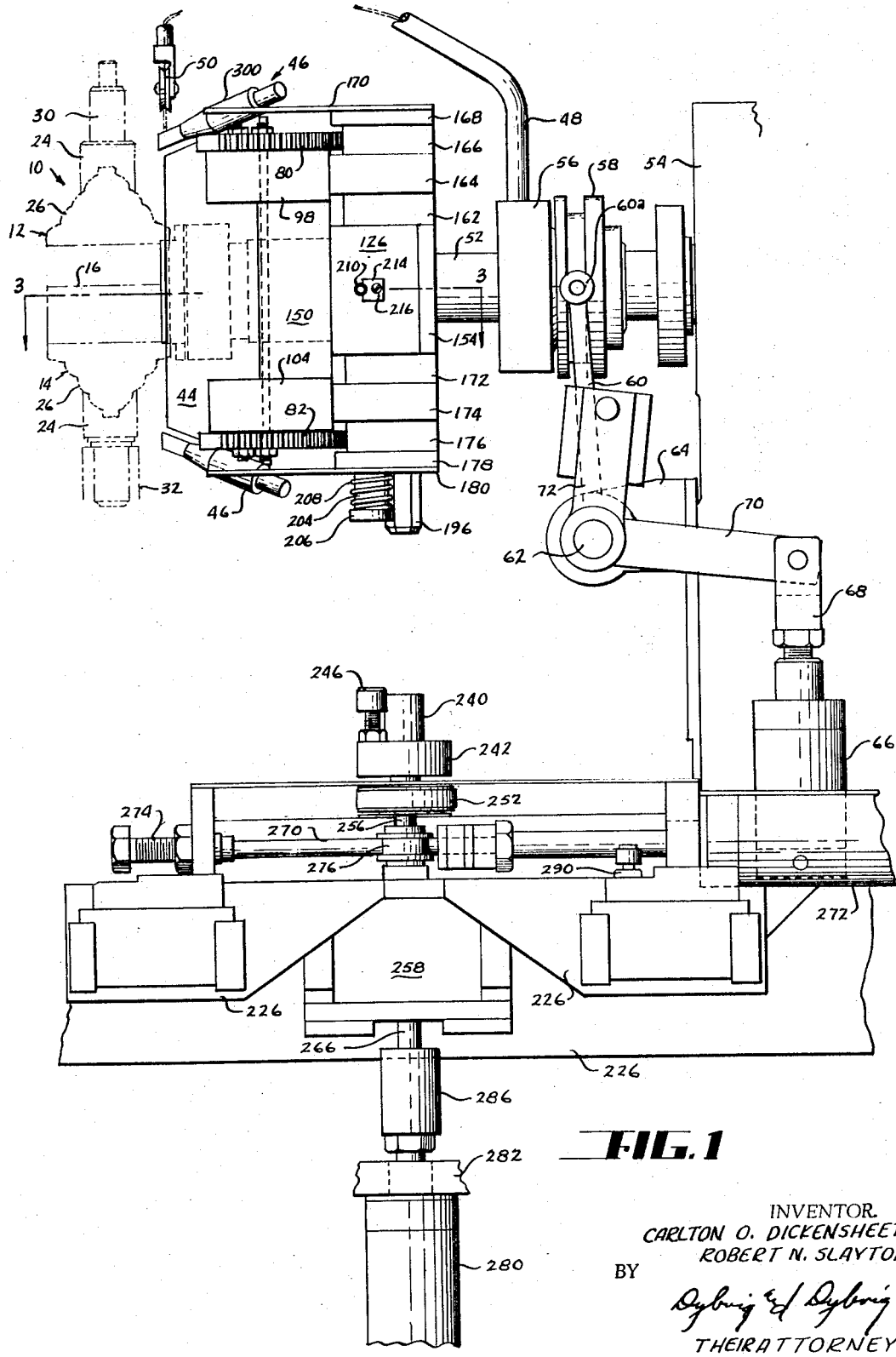
FIGURE 1 is a side elevational view, with portions broken away, of a variable or adjustable coil form assembly made in accordance with this invention.

FIGURE 11, on sheet 2 of the drawings, is a perspective view of a dummy rotor or mandrel which may be wound with coils using apparatus practicing the invention described herein.

Referring to the drawings in greater detail and with special reference to FIGURES 3, 4 and 11, apparatus made in accordance with this invention is adapted to wind a plurality of concentric coils C into a dummy rotor or mandrel, generally designated 10. The mandrel 10 has an upper end section 12, a lower end section 14 and a center section 16 to which the lower end section 14 is attached.

In FIGURE 11, the center section 16 has been removed in order to clearly show a plurality of pairs of coil receiving slots 18a, 18b, 18c and 18d symmetrically located about a split centerpiece 20 and formed in the end sections 12 and 14. The pairs of slots 18a, 18b, 18c and 18d are separated by divider plates 22 formed on a central hub 24 projecting from both outer ends of the end sections 12 and 14. The center section 16 is similarly slotted and constitutes a cylindrical extension of the end section 14. The extreme upper and lower surfaces, designated 26, of the divider plates 22 form the end turns of the coils C wound in the slots 18a, 18b, 18c and 18d. The end section 12 is slidable upon a locating pin 28 interconnecting the three sections 12, 14 and 16. The surfaces 26 slope toward the center of the mandrel 10 to permit easy removal of the coils C upon collapsing the mandrel 10 by sliding the end section 12 toward the center section 16. While one form of mandrel 10 has been described for convenience in discussing the machine used for winding coils, such mandrels are quite well known and other types of mandrels can be used.

The mandrel 10 also includes an axial mandrel shaft 30 which is supported, as by a support piece 32 shown in FIGURE 1, adjacent a coil form head 40 including a coil winding form comprised of a pair of coil form side plates 42 and 44 and guide finger assemblies 46, there being one guide finger assembly 46 mounted on the upper and lower end of each of the plates 42 and 44. As is well known in the winding art, coils of wire may be formed in the slots of the mandrel 10 upon rotation of a flier 48 having a head 50 about an axis passing transversely through the center of the mandrel 10. Wire from a supply reel (not shown), passing through the flier 48 and the head portion 50 thereof, is wound about the coil winding form side plates 42 and 44 and slides therealong into a pair of mandrel slots. The drive for the flier 48 illustrated in FIGURE 1 includes a flier drive spindle 52 which is journalled for rotation in a drive housing 54 and rotatably driven by suitable mechanism (not shown) therein. The flier 48 includes a support piece 56 which is splined to the spindle 52. Attached to the support piece 56 is a grooved member 58. A yoke 60, having opposed end portions 60a located in the groove of the member 58, is adapted to be pivoted about a pivot shaft 62 in order to move the flier 48 to and fro along the drive spindle 52. As illustrated in FIGURE 7, the pivot shaft 62 is mounted by a bracket 64 on the drive housing 54. Referring again to FIGURE 1, the yoke 60 is pivoted about the shaft 62 by means of an air cylinder or the like 66 connected, as by a forked bracket 68 on the piston of the air cylinder 66, a lever 70, and a link 72, both fixed to the shaft 62, to the yoke 60. The flier drive and adjusting mechanisms of the type usable with the apparatus disclosed herein are well known in the art. Hence, a more complete description thereof is deemed unnecessary. For reasons which will be apparent from the following description, the flier 48 is extended along the drive spindle 52 when winding the larger coils and retracted when winding the smaller coils.

The separation between the coil form side plates 42 and 44 is also adjustable in order to accommodate the various pairs of slots 18a, 18b, 18c and 18d. The mechanism for effecting their adjustment will now be described. With reference to FIGURES 2, 3, 4 and 5, the coil form side plate 42 is mounted on an outer coil form support carriage comprising a vertical support plate 74, upper and lower mounting brackets 76 and 78, respectively, upper and lower ring gear segments 80 and 82, respectively, and vertical connecting strips 84 interconnecting the ring gear segments 80 and 82 and the mounting brackets 76 and 78, respectively. The side plate 42 may be bolted or otherwise releasably fastened to the exterior face of the support plate 74, thereby enabling a ready exchange of the plate 42. The support plate 74 is welded or otherwise affixed to the confronting surfaces of the mounting brackets 76 and 78, which, as indicated in FIGURE 2, are generally pie-shaped and protrude forwardly from the ring gear segments 80 and 82.

Referring to FIGURES 2 and 4, a plurality of roller elements 90 mounted on stub shafts 92 passing through apertures in the gear segment 80 and attached thereto as by nuts 94 support the aforementioned outer carriage in an arcuate upper groove or guide track 96 cut in the upper surface of an upper carriage support member 98. A similar set of roller elements 100 (see FIGURE 4) are attached to the lower gear segment 82 of the outer carriage and travel in an arcuate lower groove or guide track 102 of a lower carriage support member 104. The roller elements 90 and 100 serve to maintain the aforementioned carriage and the coil form side plate 42 supported thereby in a predetermined position relative to the mandrel 10 and to the other elements of the coil form head 40, which will be described in greater detail below.

An inner coil form support carriage, similar to the previously described outer carriage, is provided for the coil from side plate 44 and includes a vertical support plate 106, an upper ring gear segment 108, and a lower ring gear segment 110. As illustrated in FIGURES 4 and 5, the ring gear segments 108 and 110 are located between the ring gear segments 80 and 82. Integral mounting plate portions 112 and 114 of the inner ring gear segments 108 and 110, respectively, project forwardly toward the mandrel 10. The portions 112 and 114 are pie-shaped, similar to the forwardly projecting mounting brackets 76 and 78 of the previously described outer carriage. The inner carriage, including the inner ring gear segments 108, 110 and the vertical support plate 106, is supported on the lower carriage support member 104 by roller elements 116 mounted on stub shafts 118 located in apertures in ring gear segment 110. The roller elements travel in an arcuate upper groove or guide track 120 in the member 104. Similar roller elements 122, supported by the gear segment 108 travel in an arcuate lower groove or guide track 124 in the upper carriage support member 98.

As already noted, the outer and inner carriages for the coil form side plates 42 and 44, respectively, are supported by the two carriage support members 98 and 104. The support members 98 and 104 are generally rectangular plates with concavely formed front faces corresponding to and concentric with the arcuate contour of the guide tracks 96, 102, 120, 124 and the ring gear segments 80, 82, 108 and 110. The support members 98 and 104 are supported by the body of the coil winding form head 40 which will now be described.

As shown in FIGURES 1, 3, 4 and 5, the body of the coil winding form head 40 includes a main body member 126 having a center sleeve portion 128 encircling and supported on the drive spindle 52 by a ball bearing 130 and a needle bearing 132, the latter receiving a locating shaft 134 pinned to the forward end of the drive spindle 52.

Projecting forwardly of the center sleeve portion 128 is a key support block 136 having apertures therein through which internally threaded bolts 138 project. A mandrel locating key 140 is attached to the bolts 138 by small screws 142 engaged with the internal threads thereof. Coil springs 144 bias the key 140 outwardly toward the mandrel 10. As a mandrel 10 is advanced toward the coil form head 40, key slots 146 in the center pieces 20 of the mandrel 10 mate with the outer surface of the key 140. Since the bolts 138 do not have external threads, they can slide back and forth within their apertures, thereby permitting the key 140 to move toward its support block 136 against the bias of the springs 144 and thereby minimize any shock or jolt which would result when advancing the mandrel 10 toward the coil form head 40. After a mandrel 10 has been positioned as shown in FIGURE 4, the coil form head 40 will be held against rotation by the engagement between the key 140 and the slots 146.

In addition to the center sleeve portion 128, the main body member 126 includes (FIGURES 1, 3, 4 and 5) a rectangular, rear plate portion 148 and opposed laterally extending and vertically projecting sidewalls 150 of greater vertical height than the rear plate portion 148. As indicated in FIGURES 3 and 5, the front faces 150a of the sidewalls 150 are formed concentrically with the front faces of the carriage support members 98 and 104. Further, two pairs of horizontal strengthening webs 152 connect each sidewall 150 to the center sleeve portion 128. The webs 152 project into vertical slots 154 cut in the plate portion 148 on each side of the center sleeve portion 128. The rear of the main body member 126 is capped by a bearing retainer plate 156 for the ball bearing 130.

The remainder of the coil form head 40 is generally in the form of a rectangular block comprised of a plurality of plates stacked one upon the other above and beneath the rear plate portion 148 of the main body member 126. Referring to FIGURE 1, the plates stacked above the rear plate portion 148 are designated 162, 164, 166 and 168. In addition a cam plate 170 is mounted on top the plate 168. The plates stacked beneath the rear plate portion 148 are designated 172, 174, 176 and 178 and there is a lower cam plate 180. The plate 162 is stacked directly on the top surface of the rear plate portion 148 while the plate 172 is contiguous with the lower surface of the rear plate portion 148. The plates 164 and 174 immediately on the top and the bottom, respectively, of the plates 162 and 172, serve, along with the end faces of the sidewalls 150, to support the upper and lower carriage support members 98 and 104, respectively. The various plates can be attached in any suitable manner such as by bolts or by welding. Similarly the upper and lower carriage support members 98 and 104 can be fixedly mounted on the plates 164 and 174 respectively, and the sidewalls 150, in any suitable fashion.

The coil form side plates 42 and 44 are illustrated in FIGURES 2 and 3 in position to act as a form for the innermost pair of coil receiving slots 18a in the mandrel 10. The coil form side plates 42 and 44 are moved away from one another so as to serve as a form for the next pair of coil receiving slots 18b by movement of the carriages carrying the plates 42 and 44 in opposite directions along the upper and lower carriage guide members 98 and 104. Such movement of the carriages is accomplished by a gear drive train located immediately beneath the flier drive spindle 52. This gear drive train, as shown in FIGURES 4 and 6, includes a first drive pinion 182 pinned to a shaft 184 journalled for rotation in the plates 174 and 178. The drive pinion 182 engages with an outer carriage drive gear 186 pinned to a shaft 188 which is journalled for rotation in bushings in the plate 178 and in the base of the rear plate portion 148. The outer carriage drive gear 186 has elongate teeth, the lower portions of which mesh with the gear teeth on the lower gear segment 82 of the outer carriage. As shown in FIGURE 6, the upper portion of gear 186 meshes with a reversing gear 190 pinned to a shaft 192 journalled for rotation in bushings in the plate 178 and the base of the rear plate portion 148. An inner carriage drive gear 194, also pinned to the shaft 192, and stacked on the reversing gear 190, meshes with the teeth on the lower ring gear segment 110 of the inner carriage. An actuating knob 196 directly connected to the shaft 184 may be rotated to vary the separation between the coil form side plates 42 and 44 because of the reverse drive imparted to the outer and inner carriages by the carriage drive gears 186 and 194, respectively.

After the carriages have been moved to a predetermined position by rotation of the actuating knob 196, they are locked in a fixed position by means of a plurality of locking or shot pins 200. There is one shot pin 200 for each gear segment 80, 82, 108 and 110. The shot pins 200 for the outer carriage are located in bores in the plates 166 and 176 while the shot pins for the inner carriage are similarly located in the plates 162 and 172. Referring to FIGURE 2, which shows a plan view of the shot pin 200 located in the plate 166, a forwardly projecting lug 202 thereon is engaged between two teeth on the gear segment 80. Each shot pin 200 is U-shaped to receive a reduced D-section 204a of a release bar 204 which extends the entire length of the coil form head 40 and projects therebeneath, terminating in an enlarged pad 206. There are two identical release bars 204, both designed to actuate two of the release pins 200. A spring 208 coiled about each bar 204 between the upper surface of the pad 208 and the lower surface of a notch in the plate 178 biases its associated release bar 204 downwardly against a fixed stop provided by stop pins 210 which are held in apertures in opposed wall portions of the main body member 126 and which project through elongate slots 212 in the center of the release bars 204. As ilustrated in FIGURE 3, the stop pins 210 are fixed in position by keys 214 fastened to opposite sidewalls of the rear plate portion 148 by screws or the like 216. As may be seen in FIGURE 5, each D-section 204a has a sloping surface engaging a release pin 218 which is held in the opposed legs of its associated U-shaped shot pin 200. Each shot pin 200 is normally biased forwardly of the coil form head 40 such that its lug 202 is engaged with the teeth of its associated gear segment by a disc shaped plunger device 224 having a coil spring 220 encircling a shaft 222 thereof. As apparent, if the pads 206 are urged upwardly against the bias of the springs 208, the release pins 218 will be cammed to the rear of the coil form head 40, that is to the left as viewed in FIGURE 5, against the bias of the coil springs 220 in each of the members 162, 166, 172 and 176, thus freeing the lugs 202 from engagement with their associated gear segments and permitting both the outer carriage and the inner carriage to be driven by the previously described gear drive train.

In accordance with this invention, the release bars 204 are automatically actuated to move the shot pins 200 out of engagement with the upper and lower ring gear segments 80, 82, 108 and 110 and, substantially simultaneously, the actuating knob 196 for the gear drive train is automatically operated in timed relation to the flier 48. Thus, the gear segments 80, 82, 108 and 110 are released and the actuating knob 196 rotated after a coil has been wound in the most closely placed pair of coil receiving slots 18a and then again after each subsequent coil has been wound. The automatic actuating mechanism will now be described with reference to FIGURES 1, 7, 8 and 9.

The elements of the support bed for the drive housing 54 and the various other operating parts described herein are all designated by reference character 226. Supported by a bracket 228 directly beneath the actuating knob 196 is a vertical positioning air cylinder 230 adapted to drive a splined drive actuating shaft 232 along the vertical axis of the actuating knob 196. The splined shaft 232 is connected to the piston rod of the air cylinder 230 by a connecting fixture 234 having a central bore receiving a roller bearing 236 in which the lower end of the splined shaft 232 is rotatably mounted. The upper end of the splined shaft 232 supports a female socket 238 which drivingly engages with the actuating knob 196 as the splined shaft 232 is moved upwardly upon energization of the cylinder 230. The socket 238 is received within a sleeve portion 240 of a release head 242 which is mounted by a roller bearing 244 upon the upper end of the splined shaft 232. The release head 242 supports a pair of upwardly projecting release actuating bolts or pins 246 which engage the bottom surfaces of the pads 206 as the socket member 238 engages the actuating knob 196. As apparent, the release bars 204 are moved upwardly to move the shot pins 200 out of engagement with their associated gear segments as the socket member 238 moves into position over the actuating knob 196.

After the socket member 238 is drivingly engaged with the knob 196, the splined shaft 232 is rotated by a drive system including a driven pulley 248 mounted by a roller bearing 250 on a support element 226 and drivingly engaged with the splines of the shaft 232 which passes therethrough. The pulley 248 is connected to a drive pulley 252 by a timing belt or the like 254. The drive pulley 252 is mounted on a pulley shaft 256 which projects into a gear housing 258. Mounted on the pulley shaft 256 within the housing 258 is a low speed driven gear 260 and a high speed driven gear 262. In FIGURE 8, the low speed driven gear 260 is shown meshed with a low speed drive gear 264 which is mounted on a drive shaft 266 journalled for rotation in the gear housing 258 and projecting both above and below the housing 258. An input pinion gear 268 is pinned to the drive shaft 266 above the housing 258 and is engaged by the teeth of a rack 270, which is, in turn, driven along a horizontal axis by a rack drive cylinder 272 toward and away from an adjustable stop 274 mounted on a support element 226. The rack 270 is held in engagement with the pinion 268 by a grooved roller 276 mounted for rotation about a fixed axis on a support assembly 278 affixed to the top of the gear train housing 258.

The operation of the rack 270 and the drive train including the gears 260 and 264 within the gear housing 258 and the pulleys 248 and 252 is believed obvious from an inspection thereof. Briefly, movement of the rack 270 upon actuation of the rack drive cylinder 272 drives the pinion 268, the low speed drive gear 264, the low speed driven gear 260, and the drive pulley 262, which in turn drives the pulley 248 and the splined shaft 232. The low speed gears 260 and 264 are meshed while coils are being wound by the flier 48. Of course, the rack drive cylinder 272 is not actuated until such time as a coil has been wound, the flier 48 stopped at a rest position, and the cylinder 230 actuated to position the socket 238 into engagement with the actuating knob 196. The rack 270 is then moved through a predetermined increment to separate the coil form side plates 42 and 44 to position them to serve as a coil winding form for the next pair of slots to receive a coil. The cylinder 230, which is a compound cylinder, is then actuated to withdraw the splined shaft 232 so that it will not interfere with the rotation of the flier 48. This process is repeated until all of the pairs of coil slots 18a, 18b, 18c and 18d in the mandrel 10 have been loaded with coils. The cylinder 272, also a compound cylinder, is then actuated to return the rack 270 so as to return the coil form side plates 42 and 44 to their starting position, which is that shown in FIGURES 2 and 3.

Before return of the rack 270, the gear ratios within the gear housing 258 may be changed so as to return the plates 42 and 44 at an accelerated rate. This can be accomplished upon actuation of a compound speed change air cylinder 280 supported by a bracket 282 vertically beneath the gear housing 258. Mounted on top of the piston of the cylinder 280 is a fixture 284 having a bore within which a roller bearing 286 is mounted to receive the lower end of the drive shaft 266. Upon initial actuation of the air cylinder 280, the drive shaft 266 is driven vertically upwardly whereupon a high speed drive gear 288 pinned thereto meshes with the high speed driven gear 262 within the gear housing 258. Of course, at the same time, the low speed drive gear 264 is moved out of engagement with the driven gear 260. After the rack 270 has been driven by the cylinder 272 to return the coil form side plates 42 and 44 back to their starting position, the cylinder 280 is then again actuated to return the gears within the housing 258 to the low speed position shown in FIGURE 8. While the return movement of the plates 42 and 44 can be accelerated as described above, the winding assembly is sufficiently flexible to permit return of the plates in increments; subsequently, a large coil could be wound in another mandrel 10, or on the opposite side of the mandrel 10 already wound, followed by successively smaller coils.

The main operating parts of the adjustable coil winding form provided by the side plates 42 and 44 mounted on carirages which are intermittently driven to vary the separation therebetween have been described above. A complete review of the operation of the parts is believed unnecessary. It should be noted, however, that the inner and outer carriages are automatically driven along the arcuate paths determined by the carriage drive members 98 and 104 after each coil has been wound. This drive is entirely automatic. Various limit switches are placed where necessary, or desired, to control the operation of the various air cylinders and the drive mechanism for the flier 48. Exemplary swtiches are illustrated at 290 and 292 in FIGURES 1, 7 and 8. The switch 290 senses the position of the rack 270 while the switches 292 respond to vertical travel of a pin 294 mounted on the piston of the air cylinder 280. It will be understood by those skilled in the art that the electric circuits including these limit switches which control the operation of the various operating parts can be entirely conventional and form no part of this invention.

While coils are being wound in the more closely spaced pairs of coil receiving slots, such as slots 18a and 18b, in the mandrel 10, the wire will travel along the sides of the coil form side plates 42 and 44 and, because of tension applied to the wire by the conventional tensioning device (not shown), the wire will tend to cam down to the bottom of the slots. Note in FIGURE 4 that the upper and lower end turns of these coils are formed or bent slightly about the mandrel hub 24. As the separation between the pairs of slots increases, the wire would tend to coil at the outer end of the slots, such as slots 18c and 18d, because the mandrel hub 24 considerably interferes with the movement of the wire toward the bottom of the slots. The aforementioned guide finger assemblies 46, which are mounted one on top of each coil form side plate 42 and 44 and one on the bottom of each coil form side plate 42 and 44, and controlled by the cam plates 170 and 180, serve to aid in forcing the wires forming the larger coils down to the bottom of the coil receiving slots 18c and 18d in the mandrel 10. Since the assemblies 46 are substantially identical in construction, only one will be described in detail herein.

The guide finger assembly 46 sown in FIGURE 10 includes a hollow, generally cylindrical housing 300 which is welded or otherwise fixed to the upper edge of the side plate 42. Slidable within the bore of the housing 300 is a plunger 302, the outermost edge of which is substantially coplanar with the outer face of the side plate 42. The plunger 302 is biased by a coil spring 304 wrapped therearound toward the head 40 and away from the mandrel 10. One end of the spring 304, which is attached to the plunger 302, bears against a recessed surface in the housing 300 while the other end bears against a cam follower arm 306 which is mounted on a cam follower roller 308 engaged with a cam surface 310 on the forward face of the upper cam plate 170. Upper and lower guide or clamp fingers 312 on the cam follower arm 306 maintain the roller 308 in engagement with the cam surface 310. (Only the upper clamp finger 312 can be seen in FIGURE 10.)

The cam surface 310 is eccentric to the gear segments 80, 82, 108 and 110. When the housing 300 is located close to the center of the head 40, the plunger is withdrawn away from the mandrel 10. As the outer carriage, which supports the coil form side plate 42, moves along its arcuate path to position the side plate 42 to the side of the head 40, the cam follower arm 306 abuts against the cam surface 310, forcing the plunger 302, against the bias of the spring 304, into a position overlying a substantial portion of the mandrel 10. Since the wire being wound is under tension, it will slide along the housing 300 and the plunger 302 until it slides off the end of the plunger 302 into the innermost end of the slot being filled with coils during the winding operation. In practice, the wire being wound will temporarily remain on one guide assembly 46 until it begins to slide off the other guide assembly 46 mounted on the same guide plate 42 or 44. The wire then jumps into the innermost end of the slot and is readily formed about the mandrel hub 24. As mentioned earlier, the flier 48 is extended when winding the larger coils. As shown in FIGURE 10, the forward end of the housing 300 tapers toward the plunger 302. The position of the flier 48 is adjusted to lay wires on this tapered housing portion. The guide finger plungers 302 are retracted when winding the smaller coils since the plungers 302 would otherwise limit the minimum separation between the plates 42 and 44. Also, should the wire be packed into the bottom of the more closely spaced pairs of slots 18a and 18b by the finger assemblies 46, the end turns of the wire could build up undesirably on the hub 24 and would then interfere with the subsequently wound coils.

The slots 18a, 18b, 18c and 18d in the mandrel 10 illustrated in the drawings are radially extending from the center of the hub 24. It is desirable that the outer faces of the coil form side plates 42 and 44 extend along the same radial lines as the slots. Accordingly, the arcuate guide tracks 96, 102, 120 and 124 follow an arc of a circle having its center at the axis of the mandrel hub 24. The gear segments 80, 82, 108 and 110 are concentric with the guide tracks 96, 102, 120 and 124 and the support plates 74 and 106 project radially therefrom. If the mandrel 10 were designed with coil receiving slots slightly off radial lines, the arcuate paths followed by the coil side plate support carriages would then follow a slightly different path.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention we claim:

1. In a coil winding machine, an adjustable coil winding form assembly including: a pair of coil form side plates forming wire guiding surfaces of said winding form assembly, a pair of carriages affixed to and supporting said side plates for movement therewith, means mounting said carriages for movement along an arcuate path, and adjusting means engaging and simultaneously moving said carriages in opposite directions along said arcuate path to vary the separation between said plates.

2. The structure of claim 1, wherein each of said carriages includes a ring gear segment and said adjusting means includes gear drive means engaging said ring gear segments of both carriages.

3. The structure of claim 2, wherein said adjusting means further includes movable actuating means engaging and rotating said gear drive means and further includes positioning means moving said actuating means into and out of engagement with said gear drive means.

4. In a coil winding machine for winding a plurality of concentric coils into coil receiving slots which project substantially radially from the center of a mandrel or the like, the combination comprising a winding form including a pair of adjustably mounted side plates, means supporting said side plates for movement in opposite directions along a substantially circular arc having its center at the center of said mandrel or the like, a flier for laying wires upon said winding form, adjusting means for varying the separation of said plates by moving said plates along said arc, and means operating said adjusting means in timed relation to the operation of said flier.

5. In a coil winding machine for winding a plurality of concentric coils into coil receiving slots of a mandrel or the like, the combination comprising: a winding form including a pair of adjustably mounted carriages, a pair of side plates fixedly mounted on said carriages, one carriage supporting one of said side plates and the other carriage supporting the other of said side plates, each of said carriages including a ring gear segment; a flier for laying wires upon said winding form; releasable locking means engaging said ring gear segments while said flier is rotating; adjusting means including gear drive means engaging said ring gear segments of both carriages for varying the separation of said plates and operating in timed relation to the operation of said flier; and actuating means for said adjusting means including release means operating to release said locking means prior to operation of said adjusting means.

6. In a coil winding machine, an adjustable coil winding form assembly including a pair of adjustably mounted side plates, adjusting means varying the separation of said plates, guide fingers mounted on the upper and lower edges of said side plates, each of said guide fingers including a slidable plunger adapted to move toward and away from said mandrel or the like, a plurality of cam followers, one cam follower being connected to each of said plungers, and cam surfaces engaged by said cam followers fixed in relation to said mandrel or the like, said cam followers travelling along said cam surfaces during adjustment of said plates simultaneously to adjust the position of said plungers.

References Cited

UNITED STATES PATENTS

| | | | |
|---|---|---|---|
| 2,414,218 | 1/1947 | Abrams | 242—13 |
| 3,006,564 | 10/1961 | Hambleton | 242—13 |
| 3,076,613 | 2/1963 | Turk | 242—13 |

BILLY S. TAYLOR, *Primary Examiner.*

FRANK J. COHEN, *Examiner.*